US009333424B2

(12) United States Patent
Huang et al.

(10) Patent No.: US 9,333,424 B2
(45) Date of Patent: May 10, 2016

(54) INTERACTIVE GAMING WITH CO-LOCATED, NETWORKED DIRECTION AND LOCATION AWARE DEVICES

(75) Inventors: Ronald Keryuan Huang, Milpitas, CA (US); Rob Mayor, Cupertino, CA (US); Isabel Mahe, Cupertino, CA (US); Patrick Piemonte, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 7 days.

(21) Appl. No.: 13/588,190

(22) Filed: Aug. 17, 2012

(65) Prior Publication Data

US 2012/0315994 A1 Dec. 13, 2012

Related U.S. Application Data

(63) Continuation of application No. 12/432,641, filed on Apr. 29, 2009, now Pat. No. 8,246,467.

(51) Int. Cl.
*A63F 13/30* (2014.01)

(52) U.S. Cl.
CPC ........... *A63F 13/12* (2013.01); *A63F 2300/105* (2013.01); *A63F 2300/1006* (2013.01); *A63F 2300/405* (2013.01); *A63F 2300/406* (2013.01); *A63F 2300/6045* (2013.01)

(58) Field of Classification Search
USPC .................................. 463/30, 31, 32, 37, 42
See application file for complete search history.

(56) References Cited

U.S. PATENT DOCUMENTS 5,266,938 A * 11/1993 Mogi et al. .................... 345/204

| | | | |
|---|---|---|---|
| 6,232,880 B1 | 5/2001 | Anderson et al. | |
| 6,614,420 B1 | 9/2003 | Han et al. | |
| 6,890,262 B2 * | 5/2005 | Oishi et al. ...................... | 463/31 |
| 7,961,173 B2 * | 6/2011 | Boillot ........................... | 345/158 |
| 8,456,419 B2 * | 6/2013 | Wilson ........................... | 345/158 |
| 2002/0111201 A1 | 8/2002 | Lang | |
| 2004/0077393 A1 | 4/2004 | Kim et al. | |
| 2006/0164382 A1 * | 7/2006 | Kulas et al. .................... | 345/156 |
| 2007/0005363 A1 * | 1/2007 | Cucerzan et al. .............. | 704/256 |
| 2007/0060336 A1 * | 3/2007 | Marks et al. ................... | 463/30 |

(Continued)

OTHER PUBLICATIONS

U.S. Non-Final Office Action for U.S. Appl. No. 12/432,641 dated Oct. 24, 2011, 10 pages.

(Continued)

*Primary Examiner* — Yu-Hsi D Sun
(74) *Attorney, Agent, or Firm* — Fish & Richardson P.C.

(57) ABSTRACT

An interactive game environment includes two or more co-located, networked, direction and location aware interactive game devices. The game devices share a common reference coordinate frame (e.g., a three-dimensional Cartesian coordinate frame). Each game device maintains its own device state (e.g., position, orientation, time) in the reference coordinate frame. Each interactive game device shares its device state with the other interactive game devices using communication technology (e.g., Bluetooth, Wi-Fi, cellular). Each interactive game device can use the device states of the other interactive game devices to project the relative positions and orientations of the other interactive game devices into a local, fixed coordinate frame of the interactive game device. These projections allow each interactive gaming device to know the position and orientation of the other interactive game devices in an interactive game environment defined by the reference coordinate frame.

22 Claims, 5 Drawing Sheets

(56) References Cited

U.S. PATENT DOCUMENTS

2009/0069081 A1* 3/2009 Thorner .................. 463/30
2010/0131947 A1 5/2010 Ackley et al.

OTHER PUBLICATIONS

U.S. Notice of Allowance for U.S. Appl. No. 12/432,641 dated May 2, 2012, 8 pages.

* cited by examiner

INTERACTIVE GAMING WITH CO-LOCATED, NETWORKED DIRECTION AND LOCATION AWARE DEVICES

CROSS REFERENCE TO RELATED APPLICATION

This application is a continuation (and claims the benefit of priority under 35 USC 120) of U.S. application Ser. No. 12/432,641, filed Apr. 29, 2009, now allowed, and titled "Interactive Gaming with Co-Located, Networked Direction and Location Aware Devices," which is incorporated by reference.

TECHNICAL FIELD

This subject matter is related generally to interactive gaming.

BACKGROUND

Modern mobile devices integrate a variety of communication technologies with geopositioning technology and sensors. The communication technologies (e.g., cellular, Wi-Fi, Bluetooth) allow users to communicate with other users in a variety of operating environments. Geopositioning technologies allow users to receive detailed digital maps and location-based services. Various sensors integrated in the mobile device receive input from the operating environment and provide output for a variety of interesting and useful applications running on the mobile device. For example, an accelerometer can detect when a device is held in portrait or landscape orientation, and then adjust a user interface based on the detected orientation. Sensors, such as the accelerometer in Apple Inc.'s iPhone™ have also been used in games. The user manipulates the iPhone™ in response to game action, such as trying to guide a virtual ball through a virtual maze or steer a virtual car or boat through a virtual racetrack.

SUMMARY

An interactive game environment includes two or more co-located, networked, direction and location aware interactive game devices. The game devices share a common reference coordinate frame (e.g., a three-dimensional Cartesian coordinate frame). Each game device maintains its own device state (e.g., position, orientation, time) in the reference coordinate frame. Each interactive game device shares its device state with the other interactive game devices using communication technology (e.g., Bluetooth, Wi-Fi, cellular). Each interactive game device can use the device states of the other interactive game devices to project the relative positions and orientations of the other interactive game devices into a local, fixed coordinate frame of the interactive game device. These projections allow each interactive gaming device to know the position and orientation of the other interactive game devices in an interactive game environment defined by the reference coordinate frame. An interactive game display can be generated and displayed on each game device. Various interactive games (e.g., Laser Tag) can utilize the relative positions and orientations shared between the interactive game devices to provide an enriched interactive gaming experience.

DETAILED DESCRIPTION

Example Calibration Protocol

Figure 1:
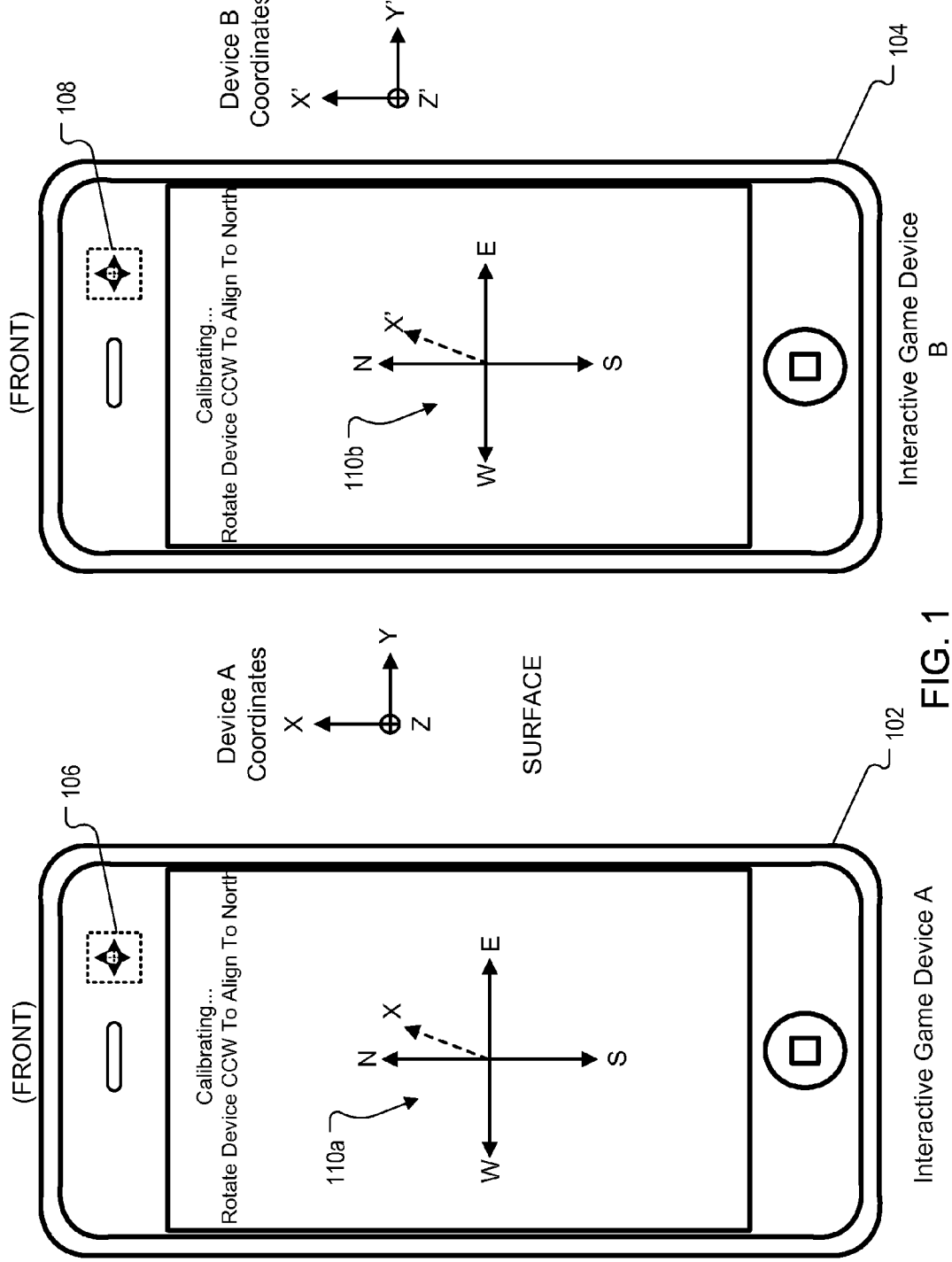
FIG. 1 illustrates a calibration protocol for interactive game devices.

FIG. 1 illustrates a calibration protocol for interactive game devices 102, 104. The game devices 102, 104 can be any mobile device with the ability to determine its position and orientation with respect to a reference coordinate frame defining an interactive game environment, and includes communication technology (e.g., wireless technology) for sharing information with other game devices. The game devices 102, 104 can include a variety of integrated sensors or can be coupled to sensors through one or more ports of the game device (e.g., USB port). Some example sensors include but are not limited to: accelerometers, gyros, geopositioning technology (e.g., GPS, cell tower triangulation, Wi-Fi), a magnetic compass and any other technology that can be used to determine position and/or orientation of a game device.

Referring to FIG. 1, an example calibration protocol will now be described. A first interactive game device 102 (Device A) is laid on a flat surface, such as a tabletop. The game device 102 has a local, fixed Cartesian coordinate frame where the x-axis lies in the plane of the game device 102 and points out of the front (see FIG. 1) of the device 102. The y-axis lies in the plane of the game device 102 and points to the right. The z-axis is perpendicular to the plane of the device 102 and points down to complete a three-dimensional, right-handed, Cartesian coordinate frame fixed to the device 102.

A second interactive game device 104 (Device B) is laid on the flat surface next to device 102 and aligned in the same direction as device 102. The game device 104 has a local, fixed Cartesian coordinate frame where the x' axis lies in the plane of the game device 104 and points out of the front of the device 104. The y'-axis lies in the plane of the game device 104 and points to the right. The z' axis is perpendicular to the plane of the device 104 and points down to complete a three-dimensional, right-handed, Cartesian coordinate frame fixed to the device 104.

In some implementations, a user can place the devices 102, 104 in a calibration mode by interacting with a hardware button or virtual user interface element. The devices 102, 104 include integrated orientation sensors 106, 108, respectively. The orientations sensors can be magnetic compasses and/or accelerometers, for example. When the calibration mode is invoked, a compass diagrams 110*a*, 110*b* are shown indicating direction, such as North, East, West and South. Also shown is the x-axis and x'-axis of the devices 102, 104, respectively. In this example, to calibrate the devices 102, 104 so that the x an x' axes are pointing North, the user(s) are instructed to rotate the devices 102, 104 counterclockwise until the x and x' axes are aligned with the North indicator of the compass diagrams 110*a*, 110*b*. The devices 102, 104 can record their respective positions (e.g., using integrated GPS receivers) and/or orientations in a cache memory database. The orientations can be used to compute the elements of a reference coordinate frame to device frame transformation matrix, as described in reference to FIG. 2.

Example Coordinate Transformations

Figure 2B:
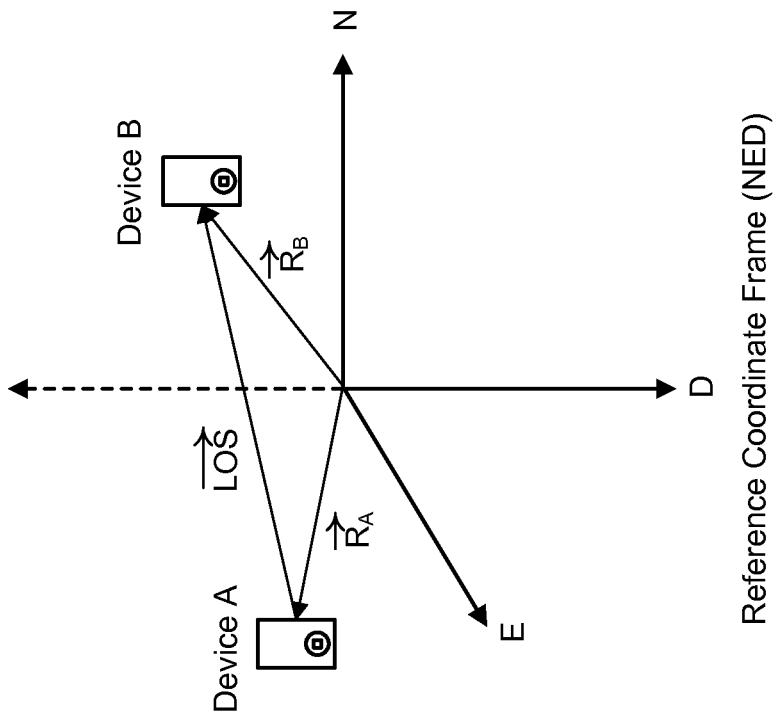
FIG. 2 illustrates a reference coordinate frame and a device coordinate frame.
Figure 2A:
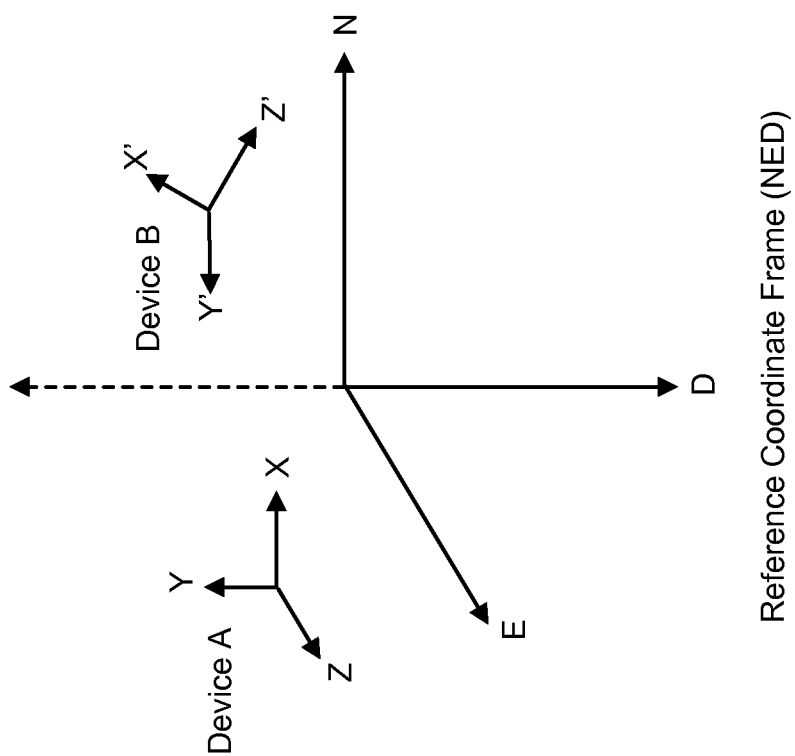

FIG. 2A illustrates a reference coordinate frame and a device coordinate frame. In this example, the well-known North-East-Down (NED) coordinate frame is shown. The NED coordinate frame is a Cartesian coordinate frame used in aircraft and spacecraft navigation. The North basis vector of the NED coordinates points North. The East basis vector points East and the cross product of the North and East basis vectors provides the Down basis vector to complete a right-handed coordinate frame.

The device coordinates, (x, y, z) and (x', y', z') can have a relative spatial orientation with respect to the NED coordinate frame, as illustrated in FIG. 2A. However, after completing the calibration protocol, and while the devices 202, 204 are stationary, the NED coordinate frame is aligned with device coordinate frames (x, y, z) and (x', y', z'). For example, the x and x' of the device coordinate frames are aligned with North of the NED frame, the y and y' axes of the device coordinate frames are aligned with East of the NED frame, and the z and z' axes of the device coordinate frames are aligned with Down of the NED frame. A transformation matrix from the NED reference frame to the device coordinate frame is given by $$T_{NED}^{Device} = \begin{bmatrix} \cos\theta\cos\psi & \cos\theta\sin\psi & -\sin\theta \\ -\cos\phi\sin\psi + \sin\phi\sin\theta\cos\psi & \cos\phi\cos\psi + \sin\phi\sin\theta\sin\psi & \sin\phi\cos\psi \\ \sin\phi\sin\psi + \cos\phi\sin\theta\cos\psi & -\sin\phi\cos\psi + \cos\phi\sin\theta\sin\psi & \cos\phi\cos\theta \end{bmatrix}, \quad (1)$$

where $\phi$ is a rotation about a new x or x' axis, $\psi$ is a rotation about a z or z' axis and $\theta$ is a rotation about a new y or y' axis.

Thus, as the devices 202, 204 are orientated away from the initial NED calibration orientation, changes in the angles, $\phi$, $\psi$, $\theta$ will be detected by the sensors 206, 208 in devices 202, 204. The sensors 206, 208 can be a magnetic compass, accelerometer, gyro or any other sensor that can sense or determine orientation. These angles can be used to compute the NED to device transformation matrix shown in (1). As illustrated in FIG. 2B, the transformation matrix (1) can be used to transform a vector $\vec{R}_{NED}$ in NED coordinates to a vector $\vec{R}_{Device}$ in device coordinates using a matrix multiplication given by $$\vec{R}_{Device} = T_{NED}^{Device} \vec{R}_{NED}. \quad (2)$$

Thus, each interactive game device 202, 204 has a position vector in the NED coordinate frame that changes as the player moves their device in the real world, interactive game environment. Each device knows its position vector by being location aware. For example, each device can include a GPS receiver, which provides a current geographic location of the device. Alternatively, inertial calculations (e.g., equations of motion) can be used to determine or estimate spatial location, where, for example, accelerometer and gyro output can be used to locate game devices 202, 204 within the reference frame. In some implementations, the GPS receiver provides a position vector for the device in Earth Center Earth Fixed (ECEF) coordinates. The device can transform the position vector from ECEF to NED coordinates using a well-known ECEF to NED transformation matrix, so that each device maintains its position in the NED coordinate frame. During game play, each device communicates its position vector in NED coordinates to the other interactive game devices using a wired or wireless communication technology (e.g., Bluetooth, Wi-Fi). Each interactive game device can transform the NED position vectors received from other game devices into its respective device coordinate frame using (2). The position vectors in the device coordinate frame can then be transformed by the game device to a two-dimensional display or screen coordinate frame which can be used to determine interactions with other devices and to, optionally, generate an interactive game display, as described in reference to FIG. 3.

Example Interactive Game Display

Figure 3:
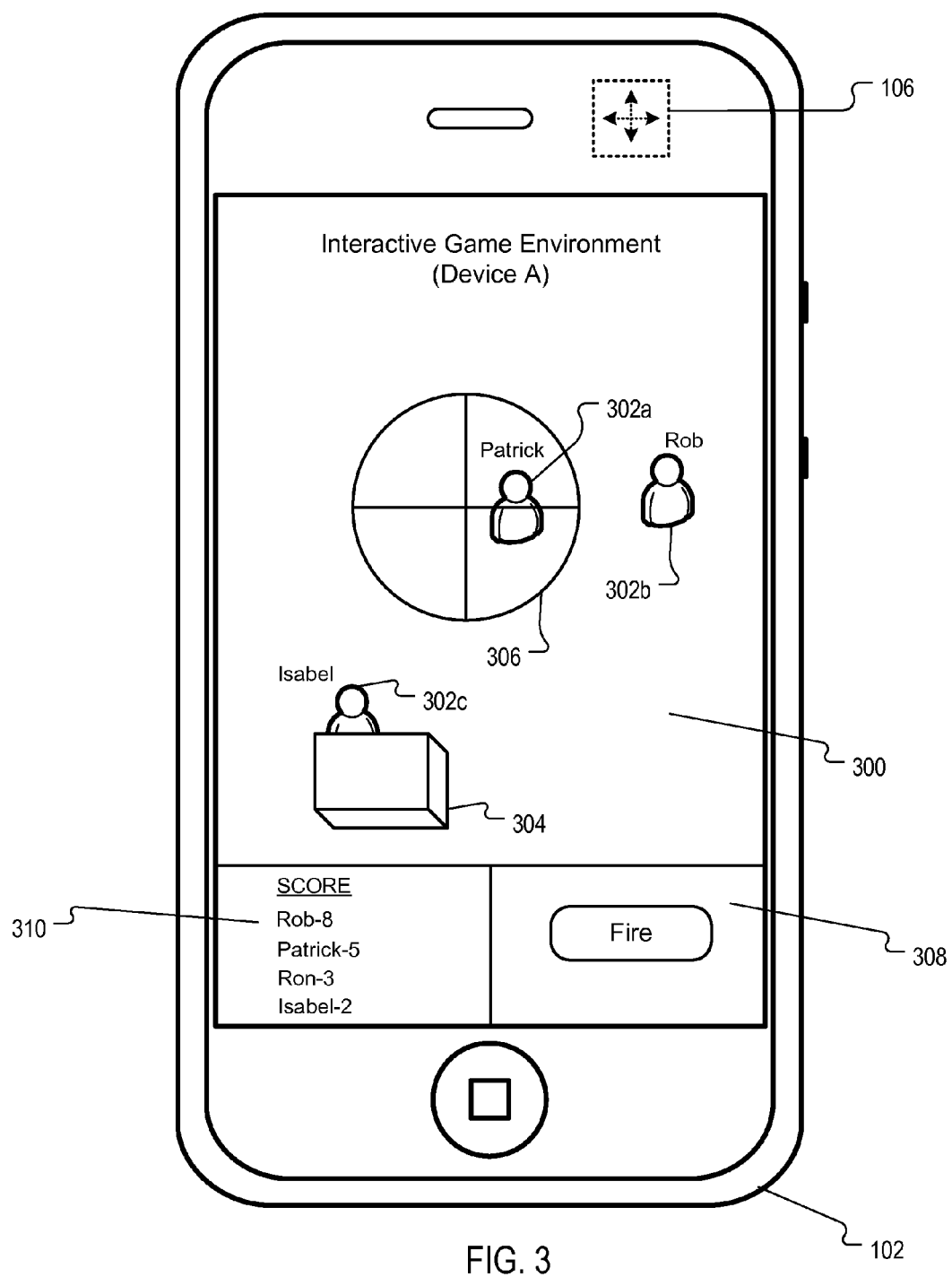
FIG. 3 illustrates an interactive game display

FIG. 3 illustrates an interactive game display. In some implementations, the positions of game devices in the reference coordinate frame defining the interactive game environment (e.g., NED coordinate frame) can be used to display player icons 302 in an interactive game display 300 on each game device. The game display 300 can have its own display coordinate frame. In this example, the display coordinate frame for Device A (operated by Ron) has a fixed alignment with the device A coordinate frame, so no additional transformation from device A coordinate frame to display coordinate frame is needed.

Referring to FIG. 3, player icons 302 are displayed on the display 300 if corresponding position vectors in reference coordinates are transformed into device (or screen) coordinates, and the transformed position vectors fall within a defined field of view (FOV). For example, to determine if a position vector for a given player is within the FOV, a dot product can be taken between the position vector in device coordinates and the x-axis of the device coordinate frame. If the angle between these vectors is less than the defined FOV (e.g., less than 85 degrees), then the player/device is deemed to be within the FOV and the corresponding player icons 302 will be displayed on the display 300. The location of the player icons 302 on the display 300 can be determined by scaling the position vectors in device coordinates to units that are consistent with the units and dimensions of the display 300.

For a Laser Tag game, the result of the methods described above are that as players point the devices at each other in the real world and "tag" each other. The mathematics described above will determine whether a player has been tagged without the device actually projecting a laser beam or other light source in the real world. If an interactive game display 300 is used, player icons 302 will appear and disappear from the respective displays 300 of each device, as the game devices move about the real world environment. That is, the locations of the player icons 302 on the respective displays 300 will change position in the displays 300 based on the relative locations of the game devices in the real world.

In the example shown, the interactive game display 300 of Device A is shown. There are three other players (three other game devices) in the example Laser Tag game. In Laser Tag, players try to "tag" other players to score points. The four players in this example game are Ron, Patrick, Rob and Isabel. Interactive game applications running on each device can allow each player to select a name or character for their player icon 302. The display 300 can include an overlay of a cross-hair 306, which can be manipulated by the players to target and tag other players. For example, the player Patrick (player icon 302a) is currently being targeted by Ron, which is illustrated by the player icon 302a for Patrick being aligned with the cross-hair 306. In some implementations, the game display 300 includes a portion 308 for firing a virtual laser and a portion 310 for displaying scores or other game information. Other user interfaces are also possible based on the needs of the game.

In some implementations, only two-dimensions of position are needed. For example, the down coordinate in NED may be ignored for some interactive games. For such games, game devices need only send North and East components of position vectors to other game devices to reduce the amount of information to be transferred to other game devices. In some implementations, a distance between game devices may be needed by the interactive game. For example, the distance between Device A and Device B can be computed by computing the magnitude of a line of sight (LOS) vector in NED coordinates given by $$D_{A/B} = |\vec{R}_B - \vec{R}_A|. \tag{3}$$

The distance parameter, D, can be used in a variety of interactive games, including games where the players are not co-located. For example, a strategic War game may allow players to fire virtual rockets or artillery shells at other players. The trajectories can be determined in a reference coordinate frame using well-known equations of motion.

In some implementations, time stamps can be sent with device states if needed by the interactive game. For example, time stamps could facilitate "replay" of game action.

In some implementations, various objects can be fixed in the interactive game environment by the game application or by players. For example, as illustrated in FIG. 3, a virtual object 304 can be placed in the game environment to improve the gaming experience. In this example, Isabel is hiding behind virtual object 304, so that other players cannot easily target her. The fixed location, physical dimensions of the virtual object, together with its distance from the shooter can be used to mathematically determine whether a LOS between two players in the interactive game environment is blocked by the virtual object 304. In a shooting game, for example, this information can be taken into account for determining whether a player was hit or "protected" by the virtual object 304. Motion can be imparted to the virtual objects, or can be altered during game play (e.g., to simulate parts being destroyed by a laser, etc.) during game play.

Example Interactive Game Device Process

Figure 4:
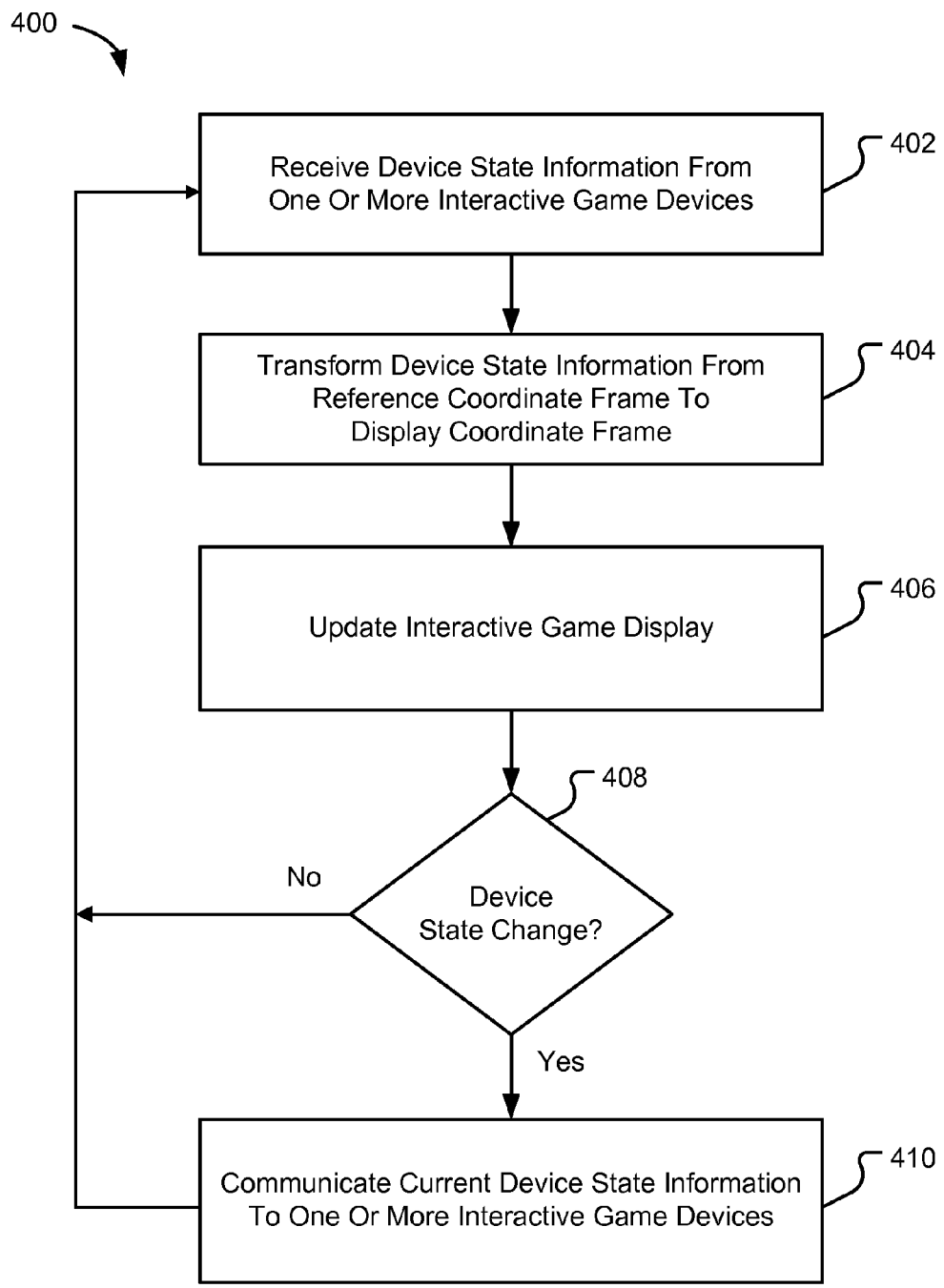
FIG. 4 is an example process performed by an interactive game device.

FIG. 4 is an example process 400 performed by an interactive game device. In some implementations, the process 400 begins when a game device receives a device state from one or more other game devices (402). For example, other game devices can send their respective device states (e.g., position, orientation, time) to the receiving game device using wireless technology, such as Bluetooth or Wi-Fi. The position vectors can be transformed from a reference coordinate frame to a local, fixed device coordinate frame (404). One or more sensors of the game devices can be used to compute the elements of a reference to device coordinate transformation matrix. In some implementations, a distance between two devices in reference coordinates can be computed from the magnitude of a LOS vector between the devices.

With the positions vectors in local device coordinates, the vectors can be compared with a FOV to determine whether the devices are within "view" of each other. In a shooting game, for example, a determination is made as to whether a player can be targeted by a crosshair. In some implementations, an interactive game display can be updated using the transformed position vectors (406). In some implementations, the display can include one or more fixed virtual objects that can be part of the interactive game environment.

If the device state of the device changes (408) because, for example, the player moves the device to a new location in a real world, interactive game environment, then the new device state is communicated to the other game devices participating in the game (410).

Each game device participating in the interactive game can perform the process 400, resulting in a interactive game environment where players move about in the real world, and game actions are determined mathematically based on a reference coordinate frame and device coordinate frames having a relative orientation determined by relative angles derived or provided by sensor data generated on each device.

The concepts described above can be extended to a variety of interactive games. The game devices can include attachments. For example, a "gun" can be attached to a game device and used by a player to target other players in the real world game environment. In this case, the orientation of the "gun" relative to the game device can be determined. This could be achieved with additional sensors in the gun, for example, and by applying the mathematical techniques described herein.

Example Interactive Game Device Architecture

Figure 5:
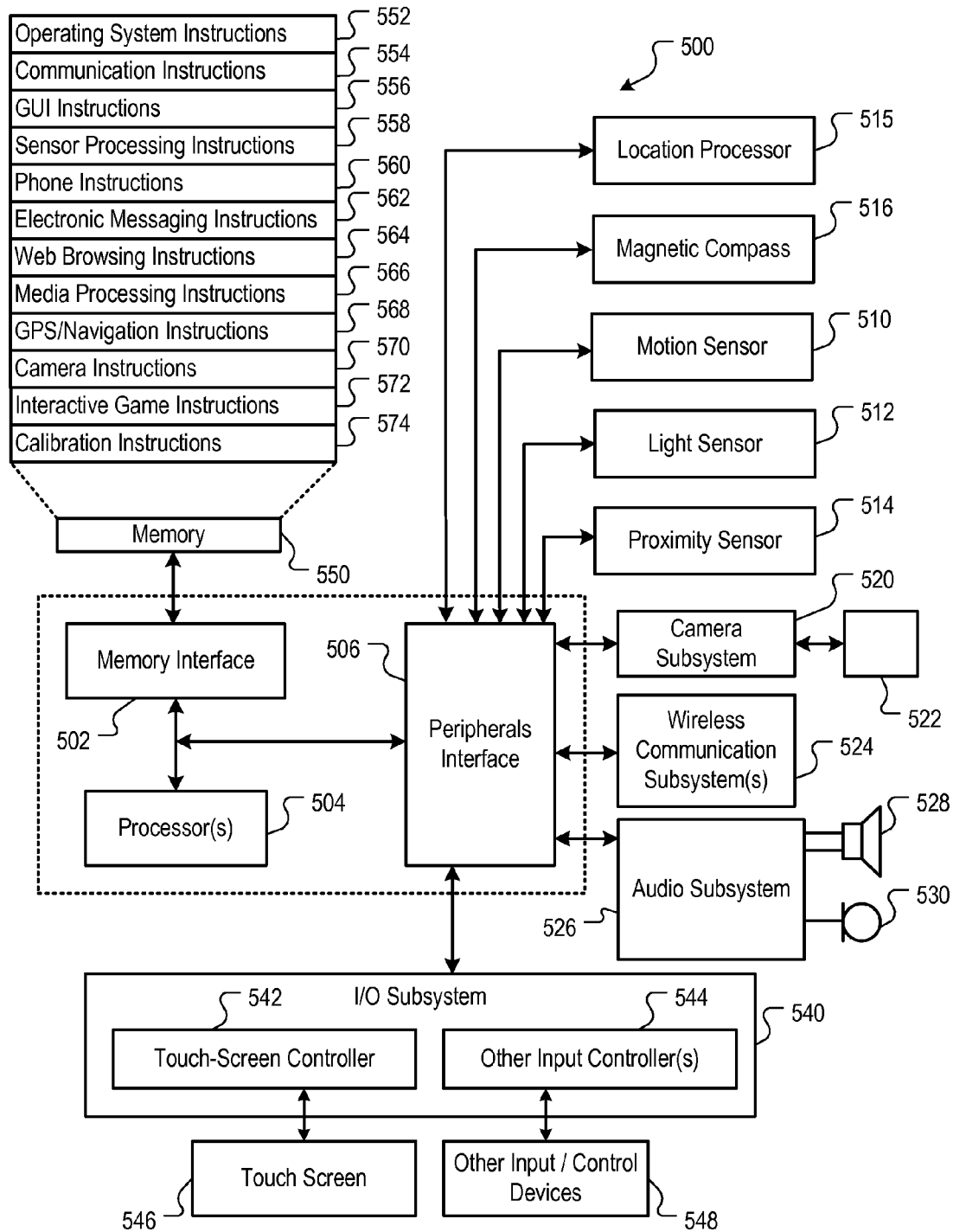
FIG. 5 is a block diagram of example architecture of an interactive game device.

FIG. 5 is a block diagram of example architecture 500 of an interactive game device. The interactive game device 100 can include a memory interface 502, one or more data processors, image processors and/or central processing units 504, and a peripherals interface 506. The memory interface 502, the one or more processors 504 and/or the peripherals interface 506 can be separate components or can be integrated in one or more integrated circuits. Various components in the interactive game device 100 can be coupled together by one or more communication buses or signal lines.

Sensors, devices, and subsystems can be coupled to the peripherals interface 506 to facilitate multiple functionalities. For example, a motion sensor 510, a light sensor 512, and a proximity sensor 514 can be coupled to the peripherals interface 506 to facilitate the orientation, lighting, and proximity functions described with respect to FIG. 1. A location processor 515 (e.g., GPS receiver) can be connected to the peripherals interface 506 to provide geopositioning. A magnetic compass integrated circuit 516 can also be connected to the peripherals interface 506 to provide orientation (e.g., to determine the direction of due North).

A camera subsystem 520 and an optical sensor 522, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 524, which can include radio frequency receivers and transmitters and/or optical (e.g., infrared) receivers and transmitters. The specific design and implementation of the communication subsystem 524 can depend on the communication network(s) over which the interactive game device 100 is intended to operate. For example, an interactive game device 100 may include communication subsystems 524 designed to operate over a GSM network, a GPRS network, an EDGE network, a Wi-Fi or WiMax network, and a Bluetooth™ network. In particular, the wireless communication subsystems 524 may include hosting protocols such that the device 100 may be configured as a base station for other wireless devices.

An audio subsystem 526 can be coupled to a speaker 528 and a microphone 530 to facilitate voice-enabled functions, such as voice recognition, voice replication, digital recording, and telephony functions.

The I/O subsystem 540 can include a touch screen controller 542 and/or other input controller(s) 544. The touch-screen controller 542 can be coupled to a touch screen 546. The touch screen 546 and touch screen controller 542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 546.

The other input controller(s) 544 can be coupled to other input/control devices 548, such as one or more buttons, rocker switches, thumb-wheel, infrared port, USB port, and/or a pointer device such as a stylus. The one or more buttons (not shown) can include an up/down button for volume control of the speaker 528 and/or the microphone 530.

In one implementation, a pressing of the button for a first duration may disengage a lock of the touch screen 546; and a pressing of the button for a second duration that is longer than the first duration may turn power to the interactive game device 100 on or off. The user may be able to customize a functionality of one or more of the buttons. The touch screen 546 can, for example, also be used to implement virtual or soft buttons and/or a keyboard.

In some implementations, the interactive game device 100 can present recorded audio and/or video files, such as MP3, AAC, and MPEG files. In some implementations, the interactive game device 100 can include the functionality of an MP3 player, such as an iPod Touch™.

The memory interface 502 can be coupled to memory 550. The memory 550 can include high-speed random access memory and/or non-volatile memory, such as one or more magnetic disk storage devices, one or more optical storage devices, and/or flash memory (e.g., NAND, NOR). The memory 550 can store an operating system 552, such as Darwin, RTXC, LINUX, UNIX, OS X, WINDOWS, or an embedded operating system such as VxWorks. The operating system 552 may include instructions for handling basic system services and for performing hardware dependent tasks. In some implementations, the operating system 552 can be a kernel (e.g., UNIX kernel).

The memory 550 may also store communication instructions 554 to facilitate communicating with one or more additional devices, one or more computers and/or one or more servers. The memory 550 may include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/Navigation instructions 568 to facilitate GPS and navigation-related processes and instructions; camera instructions 570 to facilitate camera-related processes and functions; interactive game instructions 572 to facilitate interactive gaming and calibration instructions 573 to facilitate calibrating interactive game devices, as described in reference to FIG. 1. In some implementations, the GUI instructions 556 and/or the media processing instructions 566 implement the features and operations described in reference to FIGS. 1-4.

The memory 550 may also store other software instructions (not shown), such as web video instructions to facilitate web video-related processes and functions; and/or web shopping instructions to facilitate web shopping-related processes and functions. In some implementations, the media processing instructions 566 are divided into audio processing instructions and video processing instructions to facilitate audio processing-related processes and functions and video processing-related processes and functions, respectively. An activation record and International Mobile Equipment Identity (IMEI) 574 or similar hardware identifier can also be stored in memory 550.

Each of the above identified instructions and applications can correspond to a set of instructions for performing one or more functions described above. These instructions need not be implemented as separate software programs, procedures, or modules. The memory 550 can include additional instructions or fewer instructions. Furthermore, various functions of the interactive game device 100 may be implemented in hardware and/or in software, including in one or more signal processing and/or application specific integrated circuits.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method of calibrating an interactive game device, comprising:
    detecting a user interaction with the interactive game device;
    in response to detecting the user interaction with the interactive game device:
        presenting, on a display of the interactive game device, a user interface that includes a representation of a coordinate frame that indicates a first direction, and
        presenting, on the user interface, a visual indication of divergence of a current direction of the interactive game device from the first direction as a displacement from an axis of the coordinate frame;
    detecting a movement of the interactive game device, wherein the movement of the interactive game device includes a corresponding movement of the display that is coupled to the interactive game device;
    adjusting the visual indication of divergence of the current direction of the interactive game device in the user interface based on the movement of the interactive game device;
    detecting when the current direction of the interactive game device is aligned with the first direction; and
    indicating on the user interface that the current direction of the interactive game device is aligned with the first direction.

2. The method of claim 1, wherein presenting the visual indication of the divergence of the current direction from the first direction comprises:
    providing, on the user interface, a textual message instructing a user of the interactive game device to rotate the interactive game device in a specified direction until the visual indication of the current direction of the interactive game device is aligned with the visual indication of the first direction.

3. The method of claim 1, comprising:
    recording at least one of a position or an orientation of the interactive game device; and
    computing elements of a reference coordinate frame to a device frame transformation matrix using the recorded orientation of the interactive game device.

4. The method of claim 1, wherein presenting the user interface on the display of the interactive game device comprises:
    presenting, on the user interface, a compass diagram indicating direction.

5. The method of claim 1, wherein detecting the movement of the interactive game device comprises:
    measuring, using an orientation sensor coupled to the interactive game device, the movement or the orientation of the interactive game device.

6. The method of claim 5, wherein measuring, using the orientation sensor, the movement or the orientation of the interactive game device comprises:
    measuring, using one of a magnetic compass or an accelerometer, the movement or the orientation of the interactive game device.

7. The method of claim 1, wherein detecting the user interaction with the interactive game device comprises detecting user interaction with a hardware button on the interactive game device or a virtual user interface element presented on the display of the interactive game device, and
wherein presenting the user interface in response to detecting the user interaction with the interactive game device comprises:
in response to detecting the user interaction with the hardware button on the interactive game device or the virtual user interface element presented on the display of the interactive game device, activating a calibration mode of the interactive game device; and
based on activating the calibration mode, presenting, on the display of the interactive game device, the user interface that includes the representation of the coordinate frame that indicates the first direction.

8. An interactive game device, comprising:
a processor; and
memory coupled to the processor and operable for storing instructions, which, when executed by the processor, cause the processor to perform operations comprising:
detecting a user interaction with the interactive game device;
in response to detecting the user interaction with the interactive game device:
presenting, on a display of the interactive game device, a user interface that includes a representation of a coordinate frame that indicates a first direction, and
presenting, on the user interface, a visual indication of divergence of a current direction of the interactive game device from the first direction as a displacement from an axis of the coordinate frame;
detecting a movement of the interactive game device, wherein the movement of the interactive game device includes a corresponding movement of the display that is coupled to the interactive game device;
adjusting the visual indication of divergence of the current direction of the interactive game device in the user interface based on the movement of the interactive game device;
detecting when the current direction of the interactive game device is aligned with the first direction; and
indicating on the user interface that the current direction of the interactive game device is aligned with the first direction.

9. The device of claim 8, wherein the instructions that cause the processor to perform operations comprising presenting the visual indication of the divergence of the current direction from the first direction include instructions that cause the processor to perform operations comprising:
providing, on the user interface, a textual message instructing a user of the interactive game device to rotate the interactive game device in a specified direction until the visual indication of the current direction of the interactive game device is aligned with the visual indication of the first direction.

10. The device of claim 9, wherein the user interface includes a compass diagram indicating direction.

11. The device of claim 8, comprising an orientation sensor that is used by the processor in detecting the movement or the orientation of the interactive game device.

12. The device of claim 11, wherein the orientation sensor is one of a magnetic compass or an accelerometer.

13. The device of claim 8, comprising instructions that cause the processor to perform operations comprising:
recording at least one of a position or an orientation of the interactive game device; and
computing elements of a reference coordinate frame to a device frame transformation matrix using the recorded orientation of the interactive game device.

14. The device of claim 13, comprising an integrated GPS receiver that is configured to be used by the processor in recording at least one of the position or the orientation of the interactive game device.

15. The interactive game device of claim 8, wherein detecting the user interaction with the interactive game device comprises detecting user interaction with a hardware button on the interactive game device or a virtual user interface element presented on the display of the interactive game device, and
wherein presenting the user interface in response to detecting the user interaction with the interactive game device comprises:
in response to detecting the user interaction with the hardware button on the interactive game device or the virtual user interface element presented on the display of the interactive game device, activating a calibration mode of the interactive game device; and
based on activating the calibration mode, presenting, on the display of the interactive game device, the user interface that includes the representation of the coordinate frame that indicates the first direction.

16. A computer program product, embodied in a non-transitory computer-readable medium storing instructions, which, when executed by a processor, cause the processor to perform operations comprising:
detecting a user interaction with an interactive game device;
in response to detecting the user interaction with the interactive game device, presenting, on a display of the interactive game device:
a user interface that includes a representation of a coordinate frame that indicates a first direction, and
presenting, on the user interface, a visual indication of divergence of a current direction of the interactive game device from the first direction as a displacement from an axis of the coordinate frame;
detecting a movement of the interactive game device, wherein the movement of the interactive game device includes a corresponding movement of the display that is coupled to the interactive game device;
adjusting the visual indication of divergence of the current direction of the interactive game device in the user interface based on the movement of the interactive game device;
detecting when the current direction of the interactive game device is aligned with the first direction; and
indicating on the user interface that the current direction of the interactive game device is aligned with the first direction.

17. The computer program product of claim 16, wherein the instructions that cause the processor to perform operations comprising presenting the visual indication of the divergence of the current direction from the first direction include instructions that cause the processor to perform operations comprising:
providing, on the user interface, a textual message instructing a user of the interactive game device to rotate the interactive game device in a specified direction until the visual indication of the current direction of the interactive game device is aligned with the visual indication of the first direction.

18. The computer program product of claim 17, wherein the user interface includes a compass diagram indicating direction.

19. The computer program product of claim 16, comprising instructions that cause the processor to perform operations comprising:
   recording at least one of a position or an orientation of the interactive game device; and
   computing elements of a reference coordinate frame to a device frame transformation matrix using the recorded orientation of the interactive game device.

20. The computer program product of claim 16, wherein the instructions that cause the processor to perform operations comprising detecting the movement of the interactive game device include instructions that cause the processor to perform operations comprising:
   measuring, using an orientation sensor coupled to the interactive game device, the movement or the orientation of the interactive game device.

21. The computer program product of claim 20, wherein the instructions that cause the processor to perform operations comprising measuring, using the orientation sensor, the movement or the orientation of the interactive game device include instructions that cause the processor to perform operations comprising:
   measuring, using one of a magnetic compass or an accelerometer, the movement or the orientation of the interactive game device.

22. The computer program product of claim 16, wherein detecting the user interaction with the interactive game device comprises detecting user interaction with a hardware button on the interactive game device or a virtual user interface element presented on the display of the interactive game device, and
   wherein presenting the user interface in response to detecting the user interaction with the interactive game device comprises:
      in response to detecting the user interaction with the hardware button on the interactive game device or the virtual user interface element presented on the display of the interactive game device, activating a calibration mode of the interactive game device; and
      based on activating the calibration mode, presenting, on the display of the interactive game device, the user interface that includes the representation of the coordinate frame that indicates the first direction.

\* \* \* \* \*